United States Patent
Nguyen et al.

(10) Patent No.: US 6,486,451 B1
(45) Date of Patent: Nov. 26, 2002

(54) TOASTER CHASSIS ASSEMBLY WITH IMPROVED SAFETY DEVICE

(75) Inventors: Nhiem Viet Nguyen, Glen Allen, VA (US); John J. Datovech, Ashland, VA (US); Jim Gaynor, Richmond, VA (US)

(73) Assignee: Hamilton Beach/Proctor-Silex, Inc., Glen Allen, VA (US)

( * ) Notice: Subject to any disclaimer, the term of this patent is extended or adjusted under 35 U.S.C. 154(b) by 0 days.

(21) Appl. No.: 09/960,155

(22) Filed: Sep. 21, 2001

(51) Int. Cl.[7] .............................................. A47J 37/08
(52) U.S. Cl. ....................... 219/521; 219/392; 219/386; 219/413; 99/327; 99/338
(58) Field of Search ................................. 219/521, 509, 219/392, 412–414, 491, 493; 99/327, 338, 385

(56) References Cited

U.S. PATENT DOCUMENTS

| | | |
|---|---|---|
| 2,251,925 A | 8/1941 | Edmunds et al. |
| 2,835,192 A | 5/1958 | Sivacek |
| 3,129,651 A | 4/1964 | Visos |
| 3,129,652 A | 4/1964 | Kueser |
| 3,438,318 A | 4/1969 | Williams |
| 3,869,970 A | 3/1975 | Eagle |
| 3,956,978 A | 5/1976 | Borley |
| 4,188,865 A | 2/1980 | Bjarsch |
| 4,217,482 A | 8/1980 | Wadia |
| 4,395,621 A | 7/1983 | Parker |
| 4,755,656 A | 7/1988 | Charlesworth et al. |
| 5,044,263 A | 9/1991 | Birkert et al. |
| 5,094,154 A | 3/1992 | Nopanen |
| 5,126,536 A | 6/1992 | Devlin |
| 5,283,421 A | 2/1994 | Richards |
| 5,304,782 A | 4/1994 | McNair et al. |
| 5,385,082 A | 1/1995 | Huggler et al. |
| 5,653,158 A | 8/1997 | Balandier et al. |
| 5,664,481 A | 9/1997 | Huggler |
| 5,705,791 A | 1/1998 | Sutton et al. |
| 5,802,957 A | 9/1998 | Wanat et al. |
| 5,918,532 A | 7/1999 | Arnedo et al. |
| 6,123,012 A | 9/2000 | Hardin et al. |
| 6,129,007 A | 10/2000 | Chan et al. |
| 6,240,834 B1 | 6/2001 | Chen et al. |
| 6,298,772 B1 | 10/2001 | Nguyen et al. |
| 6,311,608 B1 * | 11/2001 | Hardin et al. ................ 219/521 |

FOREIGN PATENT DOCUMENTS

| | | |
|---|---|---|
| AU | 34013/93 | 3/1993 |
| DE | 26 24 563 B1 | 9/1977 |
| FR | 77 16557 | 12/1977 |
| GB | 568498 | 4/1945 |
| GB | 1400429 | 7/1975 |
| GB | 1573012 | 8/1980 |
| JP | 47-28276 | 11/1972 |
| WO | WO 88/00808 | 2/1988 |

* cited by examiner

*Primary Examiner*—Joseph Pelham
(74) *Attorney, Agent, or Firm*—Akin, Gump, Strauss, Hauer & Feld, L.L.P.

(57) ABSTRACT

An electric toaster with a safety shut-off mechanism includes a carriage bracket with a user-manipulated knob that is movable between an upper rest position and a lower actuation position. A food support member is supported by the carriage bracket between the upper rest position and a lower toasting position. An electromagnet is connected to one of the chassis and the carriage bracket for holding the carriage bracket in the actuation position when the electromagnet is energized. A switch is movable to a closed position upon downward movement of the carriage bracket to the actuation position to energize the electromagnet and heating elements associated with the toaster. The carriage bracket is upwardly movable upon deenergization of the electromagnet to open the switch between the actuation position and the lower toasting position to deenergize the heating elements. With this arrangement, the heating elements are deenergized while the food support member is in the lower toasting position to thereby prevent further operation of the heating elements in the event of a food jam.

12 Claims, 5 Drawing Sheets

TOASTER CHASSIS ASSEMBLY WITH IMPROVED SAFETY DEVICE

BACKGROUND OF THE INVENTION

This invention relates to electric toasters, and more particularly to an improved safety device for an electric toaster for arresting operation of the toaster in the event of a jammed food item.

Household toasters commonly have a control chamber separated from a toasting chamber by a vertical end wall. A support carriage is slidably received on a support post in the control chamber and carries a pair of bread lifters that extend into and at least partially through the toasting chamber between heating elements located in the toasting chamber. The support carriage, and thus the bread lifters, are vertically movable between a raised nontoasting position for permitting the bread or other food items to be placed on or removed from the bread lifters and a lowered toasting position for holding bread or other food items in position to be toasted.

In many toasters, a coil spring biases the support carriage upwardly so that the bread lifters are normally in the raised position. The support carriage can be lowered to the toasting position by manipulation of a control lever accessible from outside the toaster housing. During a toasting cycle, a latch mechanism holds the support carriage and thus the bread lifters in the lowered toasting position. The duration of the toasting cycle can be adjusted by a user-manipulated control knob.

Some toasters include a lost-motion safety device wherein the bread is lowered by the support carriage onto holding tabs that extend from a sheet metal base of the toaster. The tabs are formed by stamping U-shaped slots in the sheet metal base then bending the tabs to form cantilevered supports. Once the bread is supported on the holding tabs, the support carriage can continue to descend until locked or latched in a toasting position, whereupon heating elements are energized to toast the bread. Should the bread become lodged at the end of a toasting cycle, the support carriage will move upward to de-energize the heating elements before the bread lifters contact the bread. In this manner, the toasting cycle is stopped before the bread reaches an unpleasant state, and any danger associated with manually removing the bread from the toaster is minimized.

The prior art method of forming the holding tabs in the base of the toaster for the lost-motion safety device is a time-consuming task that requires special machinery and/or extra processing steps, resulting in a higher cost per toaster unit. In order to maintain a competitive edge in the toaster industry, there is a continuous need to improve toaster mechanisms and their method of manufacture to realize further cost savings while maintaining safety standards. Accordingly, it would be advantageous to provide a toaster with an improved safety device with a lost motion mechanism that does not require holding tabs or the like.

SUMMARY OF THE INVENTION

According to the invention, an electric toaster comprises a chassis having at least one toasting compartment. At least one electric heater is located at least adjacent the at least one toasting compartment. A carriage bracket is supported on the chassis for movement between an upper rest position and a lower actuation position and is biased toward the upper rest position. A food support member is positioned in the at least one toasting compartment for supporting a food item. The food support member is supported by the carriage bracket between the upper rest position and a lower toasting position. An electromagnet is connected to one of the chassis and the carriage bracket for holding the carriage bracket in the actuation position when the electromagnet is energized. At least one switch is movable to a closed position upon downward movement of the carriage bracket to the actuating position to energize the electromagnet and the at least one heating element. The carriage bracket is upwardly movable upon deenergization of the electromagnet to open the at least one switch between the actuation position and the lower toasting position to thereby deenergize the at least one heating element. With this arrangement, the at least one heating element is deenergized while the food support member is in the lower toasting position to thereby prevent further operation of the at least one heating element. This is especially advantageous in the event of a food jam where the food support member is lodged in the lower toasting position.

Further according to the invention, a safety shut-off device for an electric toaster is provided. The electric toaster has a food support member movable in a toasting chamber between an upper rest position and a lower toasting position and at least one heating element located in the toasting chamber. The safety shut-off device comprises a carriage bracket supported on the chassis for movement between the upper rest position and a lower actuating position. The carriage bracket includes a support arm that supports the food support member between the upper rest position and the lower toasting position. The support arm is free of the food support member between the lower toasting position and the lower actuating position. At least one switch is movable to a closed position upon downward movement of the carriage bracket to the lower actuating position to thereby energize the at least one heating element. The carriage bracket is upwardly movable at the end of a toasting cycle to open the at least one switch between the lower actuating position and the lower toasting position to thereby deenergize the at least one heating element. In this manner, the at least one heating element is deenergized while the food support member is in the lower toasting position to thereby prevent further operation of the at least one heating element.

BRIEF DESCRIPTION OF THE SEVERAL VIEWS OF THE DRAWINGS

The preferred embodiments of the present invention will hereinafter be described in conjunction with the appended drawings, wherein.

The invention will now be described in greater detail with reference to the drawings, wherein like parts throughout the drawing figures are represented by like numerals.

DETAILED DESCRIPTION OF THE INVENTION

Figure 1:
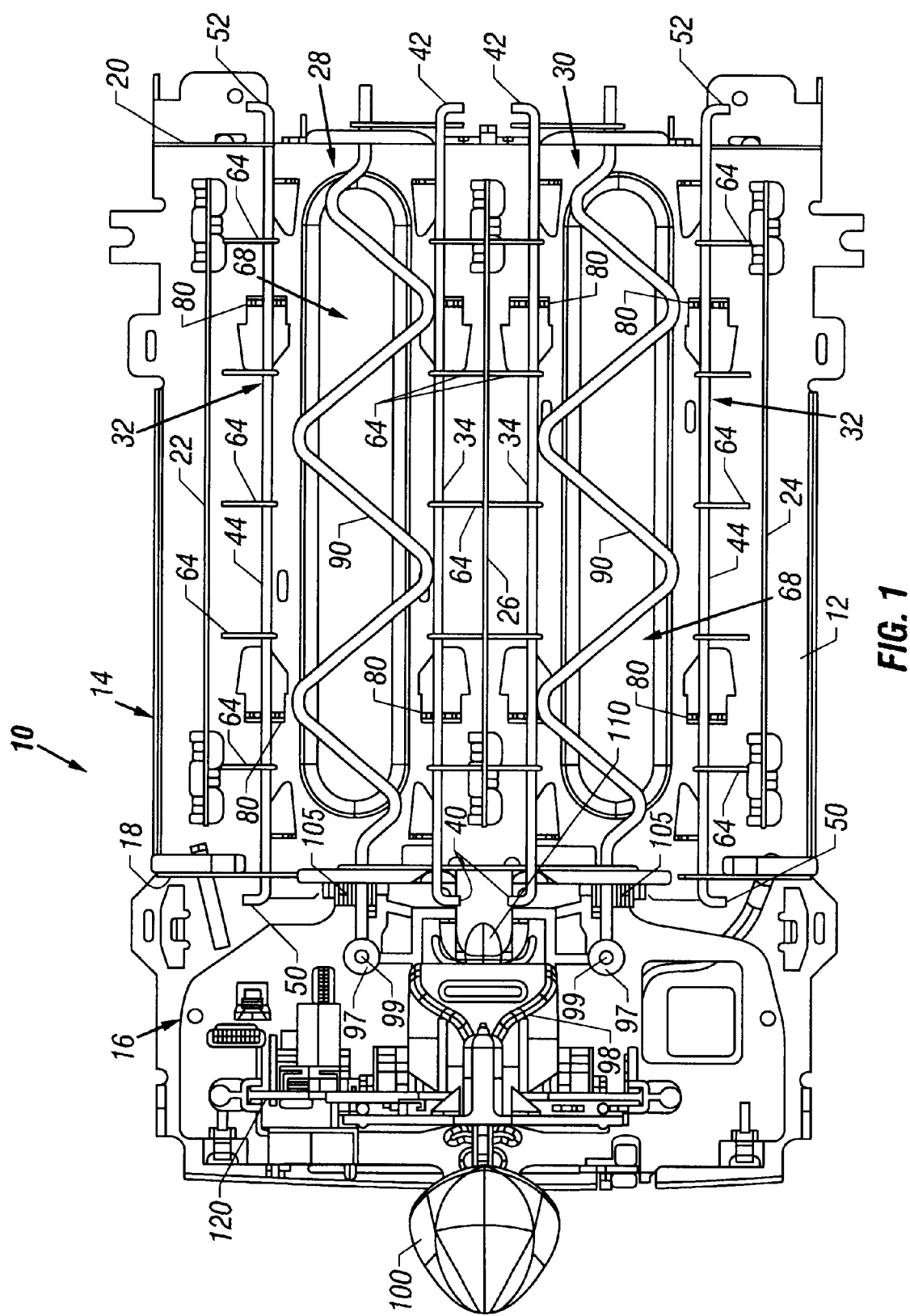
FIG. 1 is a top plan view of a toaster chassis assembly with two toasting compartments according to the present invention.
Figure 2:
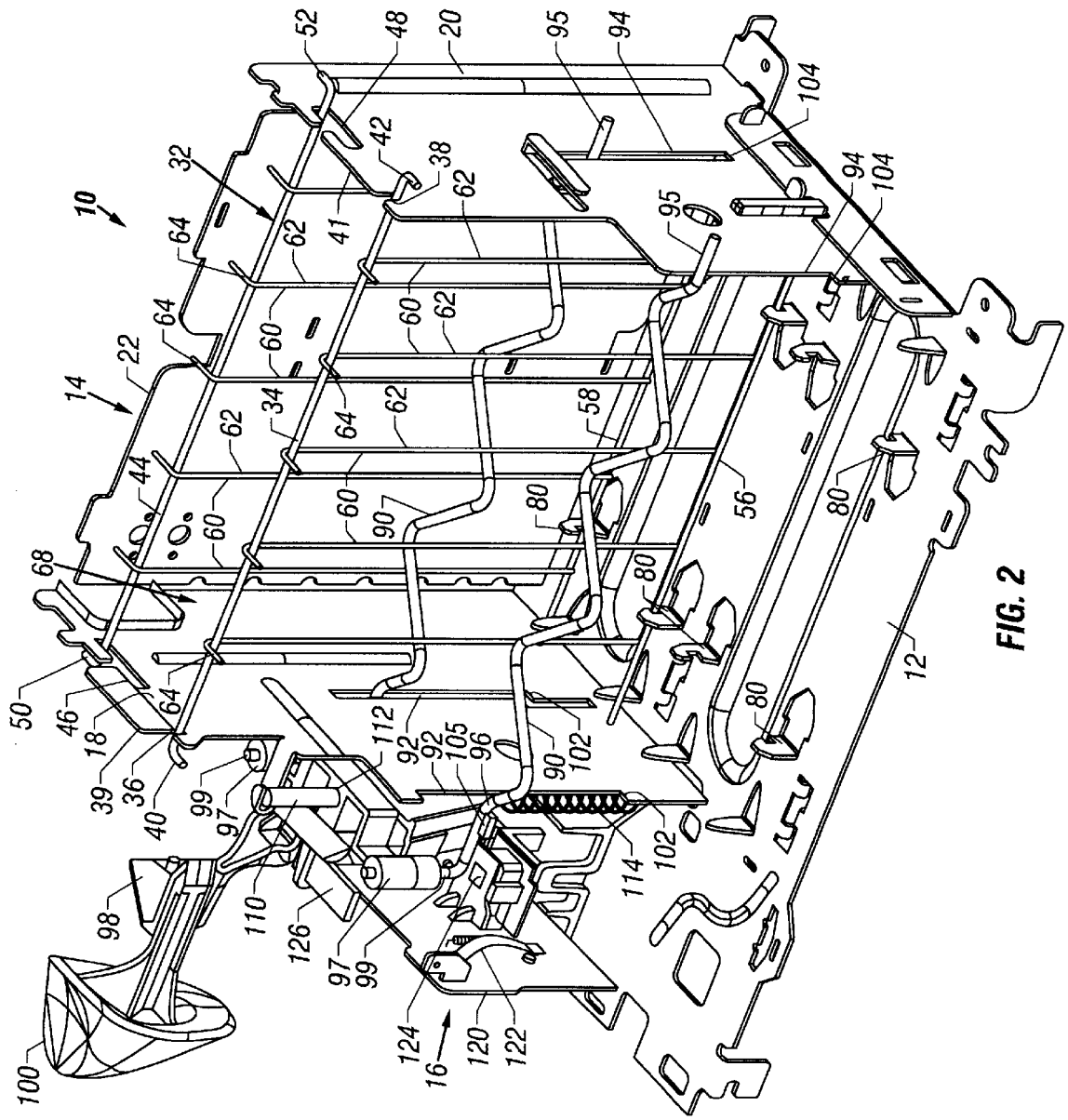
FIG. 2 is a perspective view, in partial cross section, of the toaster chassis assembly of FIG. 1 with one of the toasting compartments removed for clarity.
Figure 3:
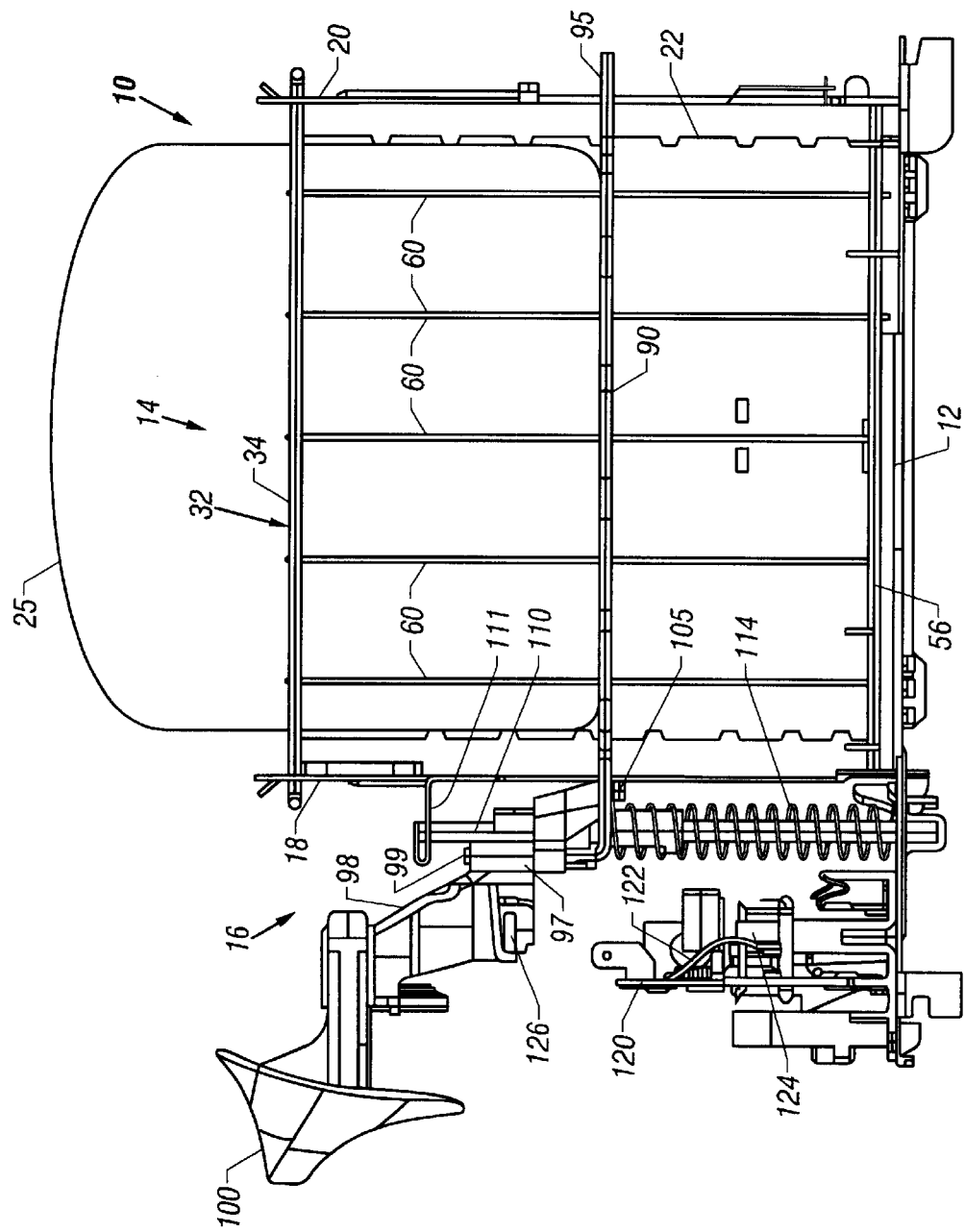
FIG. 3 is a side elevational view of the toaster chassis assembly in an upper rest or non-operational position.

Referring now to the drawings, and to FIGS. 1 to 3 in particular, a toaster chassis assembly 10 is illustrated. The chassis assembly 10 includes a base 12 with a toasting section 14 and a control section 16 for operating the toasting section.

The toasting section 14 has a forward end wall 18 and a rearward end wall 20 that are connected to the base 12 and extend upwardly therefrom. The forward end wall 18 divides the toasting section 14 from the control section 16. Side heating elements 22 and 24 extend between the end walls 18 and 20. A center heating element 26 is located between the heating elements 22 and 24 and also extends between the end walls 18 and 20. The heating elements together with the end walls form a pair of toasting compartments 28 and 30. The heating elements are of well-known construction and therefore will not be further described.

Each toasting compartment 28, 30 has a wire cage assembly 32 for holding a food item 25 (FIG. 3), such as a slice of bread or pastry item. The wire cage 32 includes an upper center rod 34 that is received within generally vertically extending slots 36 and 38 that intersect with the upper edge 39 and 41 of the end walls 18 and 20, respectively. The ends 40 and 42 of the rod 34 are bent to prevent excessive forward and rearward movement of the wire cage 32. An upper side rod 44 extends through generally horizontally extending slots 46 and 48 of the ends walls 18 and 20, respectively. The ends 50 and 52 of the rod 44 are bent to prevent excessive forward and rearward movement of the wire cage 32, yet permit lateral displacement of the rod 44 within the slots 46 and 48. A lower center rod 56 is positioned below the upper center rod 34 and extends generally horizontally between the end plates 18 and 20. Likewise, a lower side rod 58 is positioned below the upper side rod 44 and extends between the end plates 18 and 20. Preferably, the lower side rod 58 is pivotally mounted to the end plates. A plurality of L-shaped rods 60 each includes a first leg 62 that extends generally vertically between the upper and lower middle rods and between the upper and lower side rods, and a second leg 64 that extends over one of the upper middle and side rods, generally transverse to the first leg 62. The rods 60 are preferably welded to the upper and lower middle and side rods to form the lateral sides of the cage. A gap 68 is formed between the lateral sides for receiving bread or other food items to be toasted. The cage assembly 32 in this manner can receive and support bread or other food items while keeping them a safe distance away from the heating elements 22 and 26.

Each cage assembly 32 is mounted to the base 12, preferably through hook-shaped tabs 80 that are formed in the base 12 and bent to a generally vertical orientation. The hook-shaped tabs 80 grasp the lower middle and lower side rods 56 and 58, respectively, to hold the cage assembly 32 to the base 12.

Figure 4:
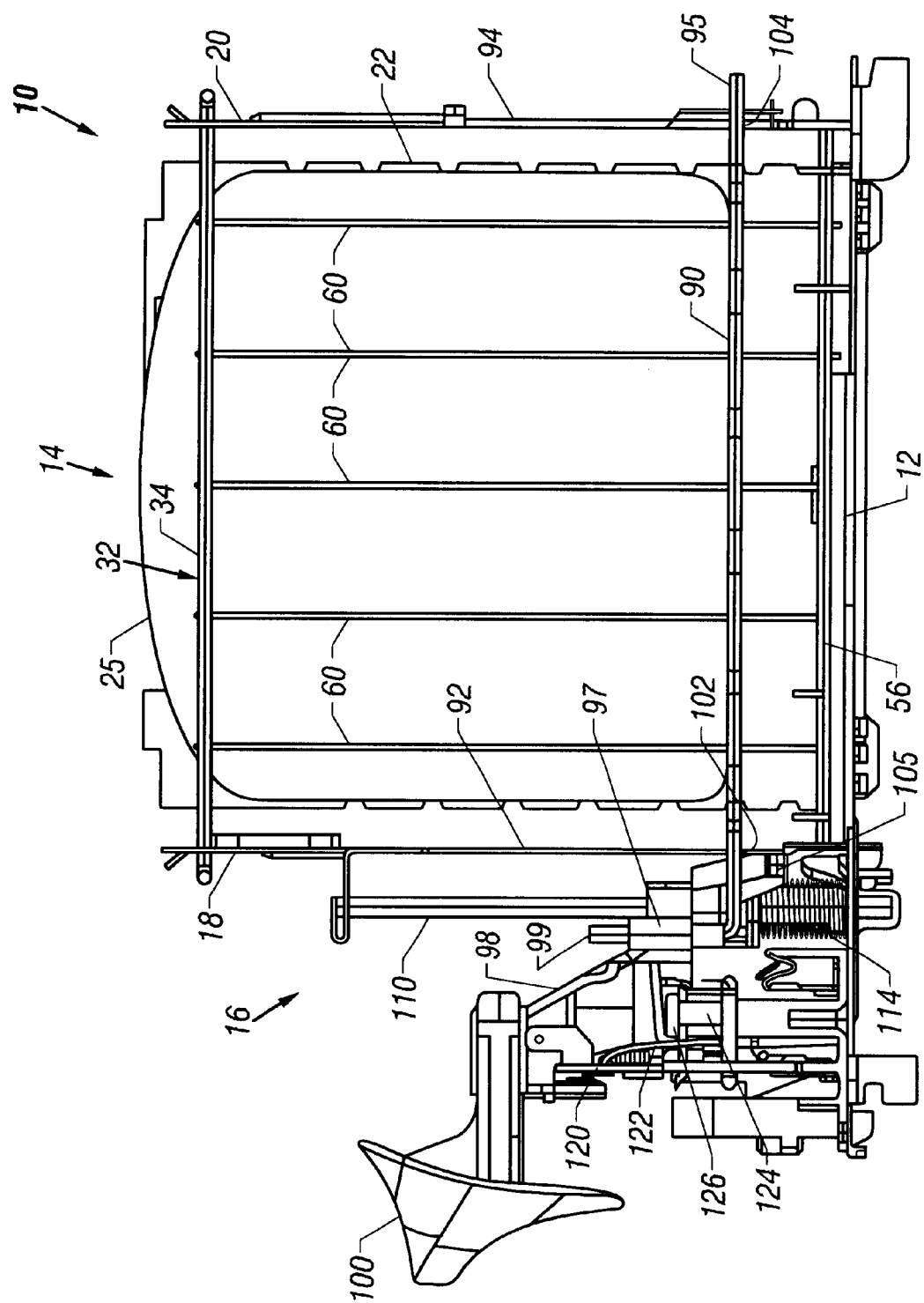
FIG. 4 is a side elevational view of the toaster chassis assembly in an operational position.

A food support or carriage rod 90 extends generally horizontally through a generally vertically oriented forward slot 92 in the end wall 18 and a corresponding generally vertically oriented rearward slot 94 in the end wall 20. A rearward end 95 of the food support rod 90 extends through the rearward slot 94 and a forward end 96 of the food support rod 90 extends through the forward slot 92 and includes a rod mounting portion 99 that is bent upwardly. Preferably, the rod mounting portion 99 is slidably received in a mounting tube 97 of a carriage bracket 98. The carriage bracket 98 is in turn connected to a user-manipulated operating knob 100 for sliding the food support rod 90 between an upper rest position (FIG. 3) and a lower toasting position (FIG. 4). The carriage bracket 98 includes a pair of support arms 105 that extend in opposite directions for holding the forward ends 96 of the food support rods 90 between the upper rest position and the lower toasting position, as will be described in greater detail below. As shown in FIG. 1, the food support rod 90 is preferably accordion-shaped between the ends 95 and 96 to support bread or other food items thereon. The slot 92 includes a lower transverse edge that forms a stop 102 (FIG. 2) while the slot 94 includes a lower transverse edge that forms a stop 104 for limiting the amount of travel of the food support rod, as will be described in greater detail below.

With additional reference to FIGS. 3 and 4, the control section 16 includes a guide rod 110 that is mounted to the base 12 and extends upwardly therefrom. An upper end of the guide rod 110 is supported by a clip 111 that is preferably formed integrally with the forward end wall 18. The carriage bracket 98 includes an opening 112 (FIG. 2) that slidably receives the guide rod 110. A compression spring 114 is installed on the guide rod 110 and extends between the base 12 and the carriage bracket 98. The spring 114 normally biases the food support rods 90 to their upper rest position.

A printed circuit board 120 also forms part of the control section 16 and is mounted to the base 12 in a generally vertical orientation. The circuit board 120 preferably includes a pair of spaced contact switches 122 (only one of which is shown) and an electromagnet 124 that is energized when the switches 122 are closed by engagement with the carriage bracket 98 during a toasting operation. An armature 126 is mounted on the carriage bracket 98 and is held by the energized electromagnet to thereby hold the food support rods 90 in their lower toasting position during the toasting operation. Although not shown, well-known means for de-energizing the electromagnet and completing the toasting operation may be provided in conjunction with a manually settable knob for adjusting the toasted color of the bread or other food item.

In operation, and by way of example, a food item 25, such as a slice of bread, can be inserted into one or more of the compartments 28 and 30 so as to rest on the one or more of the food support rods 90, as shown in FIG. 3. The operating knob 100 is then pressed downwardly to lower the food support rods 90 until the rearward end 95 contacts the rearward stop 104 of the slot 94 and the forward end 96 contacts the forward stop 102 of the slot 92, as shown in FIG. 4. The stops 102 and 104 prevent the food support rods 90 from descending further. In this position, the bread 25 faces the heating elements which are not yet energized, since the contact switches 122 are still open. Further downward movement of the carriage bracket 98 toward a lower actuation position causes the mounting tubes 97 to slide on their respective rod mounting portions 99 until the carriage bracket contacts and closes the switches 122 in the lower actuation position. Once closed, the toaster circuitry is completed to energize the heating elements and the electromagnet 124, without further downward movement of the food support rods 90. The armature 126 is engaged and held by the energized electromagnet 124 to thereby hold the carriage bracket 98 in the lower actuation position with the food support rods 90 in the lower toasting position. With the carriage bracket 98 in the lower actuation position, the support arms 105 are spaced downwardly from the food support rods 90.

After a preset time period, which may be previously set by a user, power to the electromagnet is cut off and the carriage bracket 98 springs toward the upper rest position under bias force from the spring 114. During upward movement of the carriage bracket 98, the support arms 105 contact the food support rods 90 and bring them to the upper rest position so that the bread 25 can be taken from the or each compartment. Power to the heating elements is also cut off by upward movement of the carriage bracket 98 under bias force from the spring 114, which opens the switches 122 between the lower actuation position and the lower toasting position.

Figure 5:
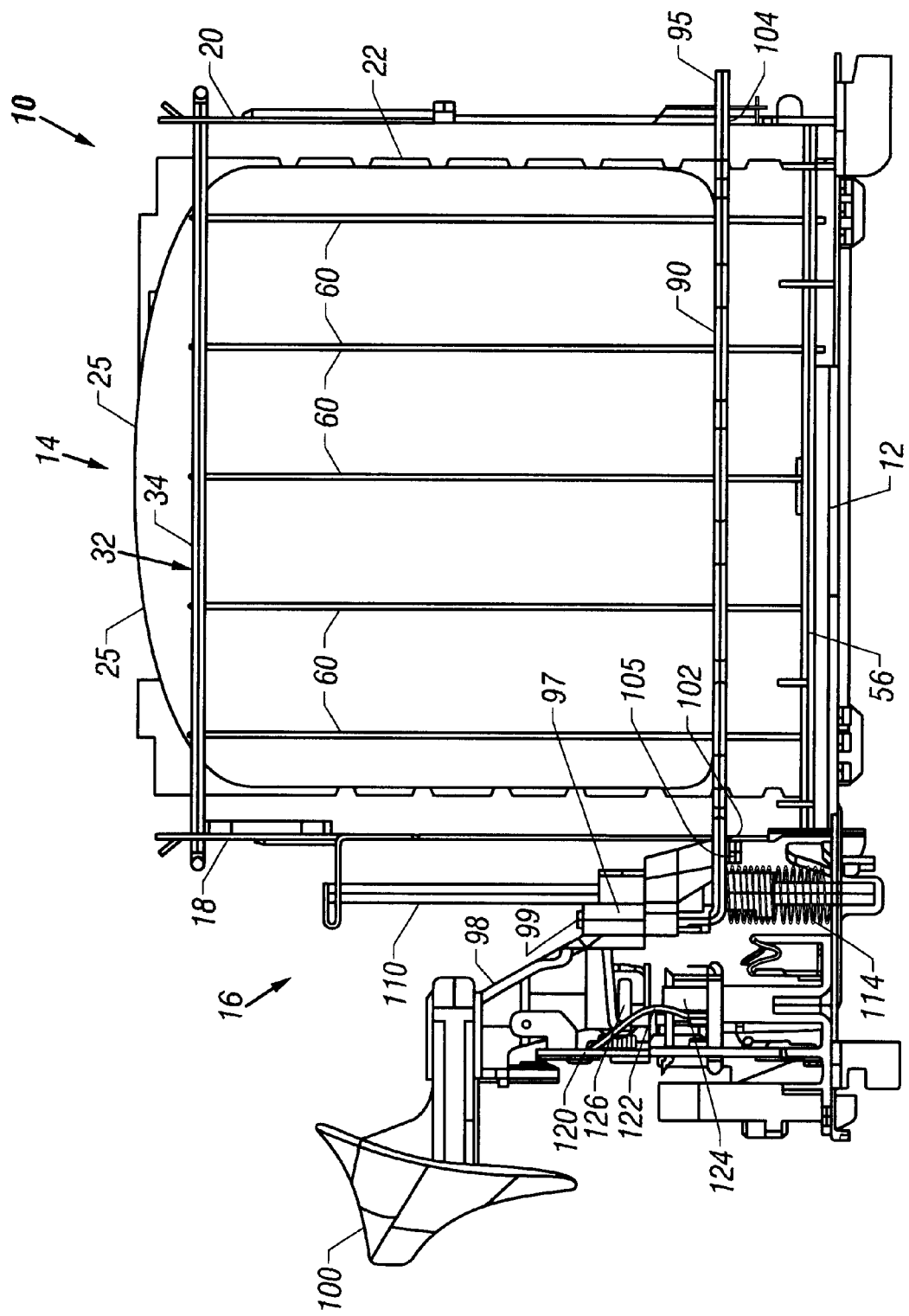
FIG. 5 is a side elevational view of the toaster chassis assembly in a safety shut-off position.

When a food item is jammed in one or both of the compartments, as shown in FIG. 5, the food support rods 90 are prevented from returning to their upper rest position. However, the distance between the lower actuating position of the carriage bracket support arms 105 and the lower toasting position of the food support rods 90 is sufficient to release the contact switches 122 before the support arms 105 come into contact with the food support rods 90 during upward movement of the carriage bracket 98 under bias from the spring 114 when the electromagnet 124 is deenergized. In this manner, the heating elements are turned off independent of the position of the food support rods 90 to thereby prevent burning of the food item.

While the invention has been taught with specific reference to the above-described embodiments, those skilled in the art will recognize that changes can be made in form and detail without departing from the spirit and the scope of the invention. Thus, the described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. An electric toaster comprising:
   a chassis having at least one toasting compartment;
   at least one electric heater located at least adjacent the at least one toasting compartment;
   a carriage bracket supported on the chassis for movement between an upper rest position and a lower actuation position;
   a food support member positioned in the at least one toasting compartment for supporting a food item, the food support member having a mounting portion that is bent generally upwardly and slidably received in the carriage bracket;
   a support arm extending from the carriage bracket, the support arm engaging and supporting the food support member against relative sliding movement so that the food support member moves with the carriage bracket between the upper rest position and a lower toasting position, the support arm being disengaged from the food support member during movement of the carriage bracket below the lower toasting position through relative sliding movement between the food support member and the carriage bracket;
   an electromagnet connected to one of the chassis and the carriage bracket for holding the carriage bracket in the actuation position when energized;
   at least one switch movable to a closed position upon downward movement of the carriage bracket to the actuation position to thereby energize the electromagnet and the at least one heating element, the carriage bracket being upwardly movable upon deenergization of the electromagnet to open the at least one switch between the actuation position and the lower toasting position to thereby deenergize the at least one heating element;
   wherein the at least one heating element is deenergized while the food support member is in the lower toasting position to thereby prevent further operation of the at least one heating element.

2. A toaster according to claim 1, and further comprising at least one stop positioned on the chassis for arresting downward movement of the food support member at the lower toasting position.

3. A toaster according to claim 2, wherein the chassis comprises a base, a forward end wall extending upwardly from the base, and a rearward end wall spaced from the forward end wall and extending upwardly from the base, the base together with the forward and rearward end walls forming the toasting compartment.

4. A toaster according to claim 3, and further comprising an elongate slot formed in at least one of the end walls, the elongate slot extending generally vertically along the at least one end wall, with an end portion of the food support member extending through the elongate slot.

5. A toaster according to claim 4, wherein the at least one stop comprises a lower transverse edge of the elongate slot.

6. A toaster according to claim 1, wherein the support arm is spaced downwardly from the food support member when the carriage bracket is in the actuation position.

7. A toaster according to claim 3, and further comprising a front elongate slot formed in the front end wall and a rear elongate slot formed in the rear end wall, the elongate slots extending generally vertically along their respective end walls, with a forward end portion of the food support member extending through the front elongate slot and a rearward portion of the food support member extending through the rear elongate slot.

8. A toaster according to claim 7, wherein the at least one stop comprises a pair of stops formed by a lower transverse edge of each of the elongate slots.

9. A toaster according to claim 8, wherein the support arm is spaced downwardly from the food support member when the carriage bracket is between the lower toasting position and the actuation position with the food support member located on the stops at the lower toasting position.

10. An electric toaster according to claim 1, wherein the food support member, including the mounting portion, is rod-shaped.

11. A safety shut-off device for an electric toaster having a toasting chamber and at least one heating element located in the toasting chamber, the safety shut-off device comprising:
    a food support member adapted for movement in the toasting chamber between an upper rest position and a lower toasting position, the food support member having a mounting portion that is bent generally upwardly;
    a carriage bracket adapted for movement between the upper rest position and a lower actuation position, the carriage bracket including an aperture that slidably receives the mounting portion of the food support member and a support arm that supports the food support member between the upper rest position and the lower toasting position, the support arm being free of the food support member between the lower toasting position and the lower actuation position so that relative sliding movement occurs between the carriage bracket and the mounting portion during carriage bracket movement between the lower toasting position and the lower actuation position;
    at least one switch movable to a closed position upon downward movement of the carriage bracket to the lower actuation position to thereby energize the at least one heating element, the carriage bracket being upwardly movable at the end of a toasting cycle to open the at least one switch between the lower actuation position and the lower toasting position to thereby deenergize the at least one heating element while the food support member is in the lower toasting position.

12. A safety shut-off device according to claim 11, wherein the food support member, including the mounting portion, is rod-shaped.

* * * * *